US010619817B2

(12) United States Patent
Koons et al.

(10) Patent No.: US 10,619,817 B2
(45) Date of Patent: Apr. 14, 2020

(54) VEHICLE LIGHT ASSEMBLY HAVING A REFLEX LENS WITH A LOCKING DETENT

(71) Applicant: Valeo North America, Inc., Seymour, IN (US)

(72) Inventors: Kevin Dwayne Koons, Seymour, IN (US); Cameron Lee Crisp, Seymour, IN (US)

(73) Assignee: Valeo North America, Inc., Seymour, IN (US)

( * ) Notice: Subject to any disclaimer, the term of this patent is extended or adjusted under 35 U.S.C. 154(b) by 137 days.

(21) Appl. No.: 15/413,602

(22) Filed: Jan. 24, 2017

(65) Prior Publication Data

US 2018/0209607 A1 Jul. 26, 2018

(51) Int. Cl.
| F21S 43/27 | (2018.01) |
| B60Q 1/32 | (2006.01) |
| F21S 41/50 | (2018.01) |
| F21S 43/50 | (2018.01) |
| F21S 43/20 | (2018.01) |
| F21W 103/15 | (2018.01) |
| F21V 17/16 | (2006.01) |

(52) U.S. Cl.
CPC .............. F21S 43/27 (2018.01); B60Q 1/32 (2013.01); F21S 41/50 (2018.01); F21S 43/26 (2018.01); F21S 43/50 (2018.01); *F21V 17/164* (2013.01); *F21W 2103/15* (2018.01)

(58) Field of Classification Search
CPC .......... F21S 41/29; F21S 41/295; F21S 43/27; F21V 17/164; F21V 17/16; F21V 17/107
See application file for complete search history.

(56) References Cited

U.S. PATENT DOCUMENTS

| 4,912,606 A * | 3/1990 | Yamamoto | ........... B60Q 1/2607 |
| | | | 362/518 |
| 5,180,219 A * | 1/1993 | Geddie | ............... F21S 48/1208 |
| | | | 362/267 |
| 5,239,449 A * | 8/1993 | Wnuk | ...................... B60Q 3/51 |
| | | | 296/37.8 |

(Continued)

FOREIGN PATENT DOCUMENTS

| CA | 2518111 A1 * | 3/2006 | ............ F21V 7/0016 |
| CN | 203586025 | 5/2014 | |

(Continued)

*Primary Examiner* — Bryon T Gyllstrom
*Assistant Examiner* — Colin J Cattanach
(74) *Attorney, Agent, or Firm* — Oblon, McClelland, Maier & Neustadt, L.L.P.

(57) ABSTRACT

A light assembly for use on a vehicle comprising a support mounted on the vehicle, at least one light source and a lens body having a first area for reflecting light and a second area for distributing light from the at least one light source. The lens body further comprises a top wall, a generally opposing bottom wall, a first side wall and a second side wall that generally opposes the first side wall, the lens body also has at least one detent or lock associated with the second area. The at least one detent or lock engages a surface on a support to which the lens body is mounted in order to lock or secure the lens body onto the support. The at least one detent or lock is not visible when viewing an exit surface of the lens after it is mounted on the vehicle.

20 Claims, 14 Drawing Sheets

(56) References Cited

U.S. PATENT DOCUMENTS

| | | | |
|---|---|---|---|
| 5,756,013 A * | 5/1998 | Yanagihara | B29C 45/062 |
| | | | 264/1.7 |
| 6,033,095 A * | 3/2000 | Ognian | F21S 48/1208 |
| | | | 362/267 |
| 6,250,787 B1 * | 6/2001 | Matubara | F21S 41/29 |
| | | | 362/520 |
| 6,364,512 B1 * | 4/2002 | Logel | F21V 17/164 |
| | | | 362/490 |
| 6,612,728 B2 | 9/2003 | Roller et al. | |
| 6,811,287 B2 | 11/2004 | Roller et al. | |
| 7,267,450 B2 * | 9/2007 | Ha | F24C 15/008 |
| | | | 219/758 |
| 7,322,722 B2 * | 1/2008 | Hartmann, Jr. | F21S 8/02 |
| | | | 362/147 |
| 8,840,289 B2 | 9/2014 | Lindsay et al. | |
| 10,190,744 B2 * | 1/2019 | Shido | F21S 45/50 |
| 2002/0003708 A1 | 1/2002 | Roller et al. | |
| 2003/0165065 A1 | 9/2003 | Roller et al. | |
| 2008/0094852 A1 * | 4/2008 | King | F21S 41/255 |
| | | | 362/516 |
| 2008/0225547 A1 * | 9/2008 | Rogers | B60Q 1/2696 |
| | | | 362/548 |
| 2009/0154186 A1 * | 6/2009 | Natsume | B60Q 1/0041 |
| | | | 362/516 |
| 2011/0075436 A1 * | 3/2011 | Zanma | F21S 43/00 |
| | | | 362/516 |
| 2011/0255298 A1 | 10/2011 | Lindsay et al. | |
| 2012/0268940 A1 * | 10/2012 | Sahlin | G02B 5/045 |
| | | | 362/290 |
| 2013/0063966 A1 * | 3/2013 | Sumi | B60Q 1/0047 |
| | | | 362/602 |
| 2013/0120988 A1 * | 5/2013 | Woodward | F21V 13/04 |
| | | | 362/235 |
| 2013/0258698 A1 * | 10/2013 | Saito | F21V 5/02 |
| | | | 362/520 |
| 2014/0301103 A1 * | 10/2014 | Colombo | B60Q 1/045 |
| | | | 362/522 |
| 2014/0355285 A1 * | 12/2014 | Yamato | B60R 13/0243 |
| | | | 362/511 |
| 2017/0159905 A1 * | 6/2017 | Shido | F21S 45/50 |
| 2017/0321859 A1 * | 11/2017 | Zawacki | F21S 41/141 |

FOREIGN PATENT DOCUMENTS

| | | |
|---|---|---|
| EP | 0570278 | 11/1993 |
| FR | 1443756 | 6/1966 |
| FR | 2021553 | 7/1970 |
| FR | 2713167 | 6/1995 |
| JP | 2001216813 | 8/2001 |
| JP | 2012108213 | 6/2012 |
| JP | 2014143120 | 8/2014 |
| RO | 129391 | 4/2014 |

* cited by examiner

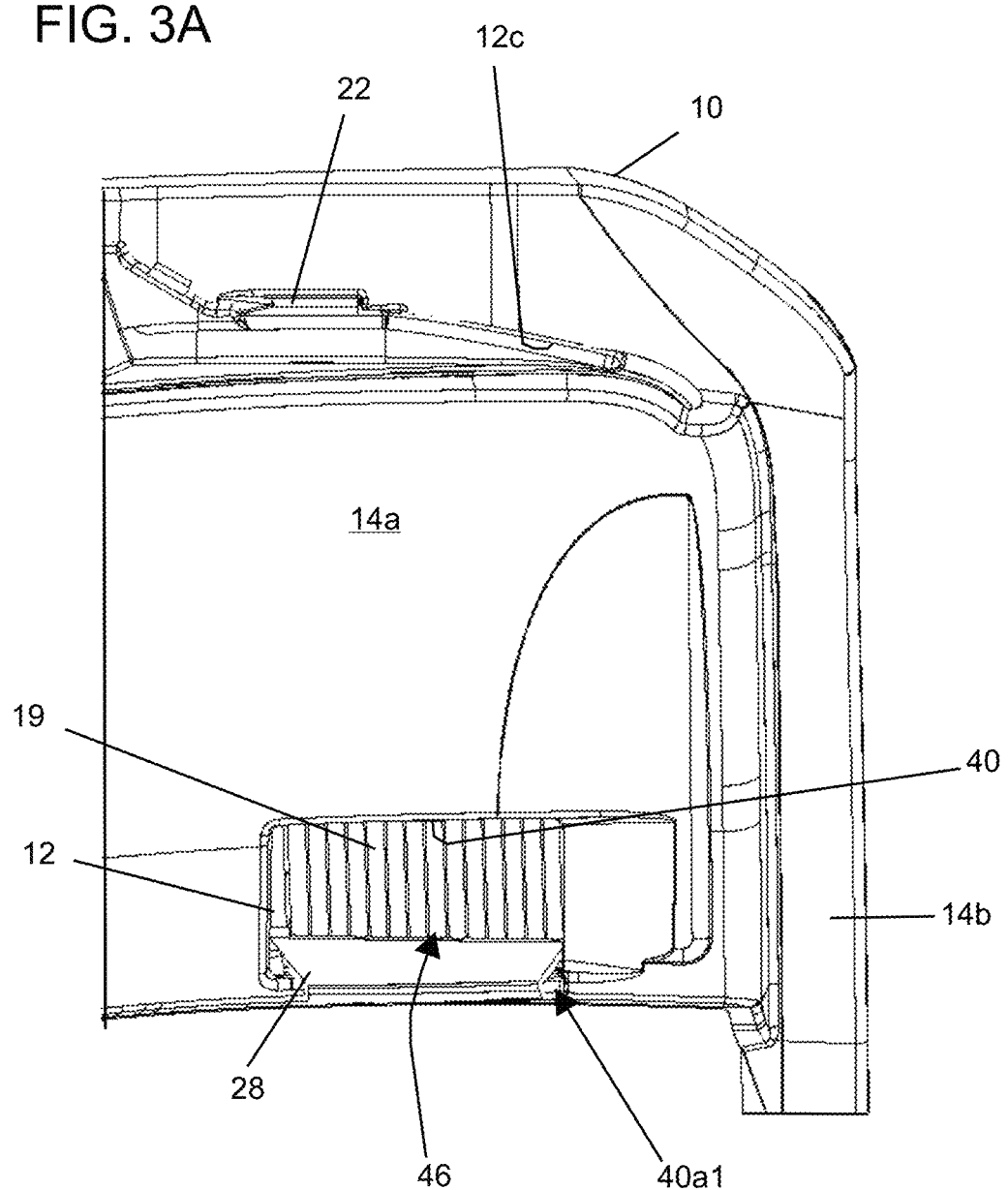

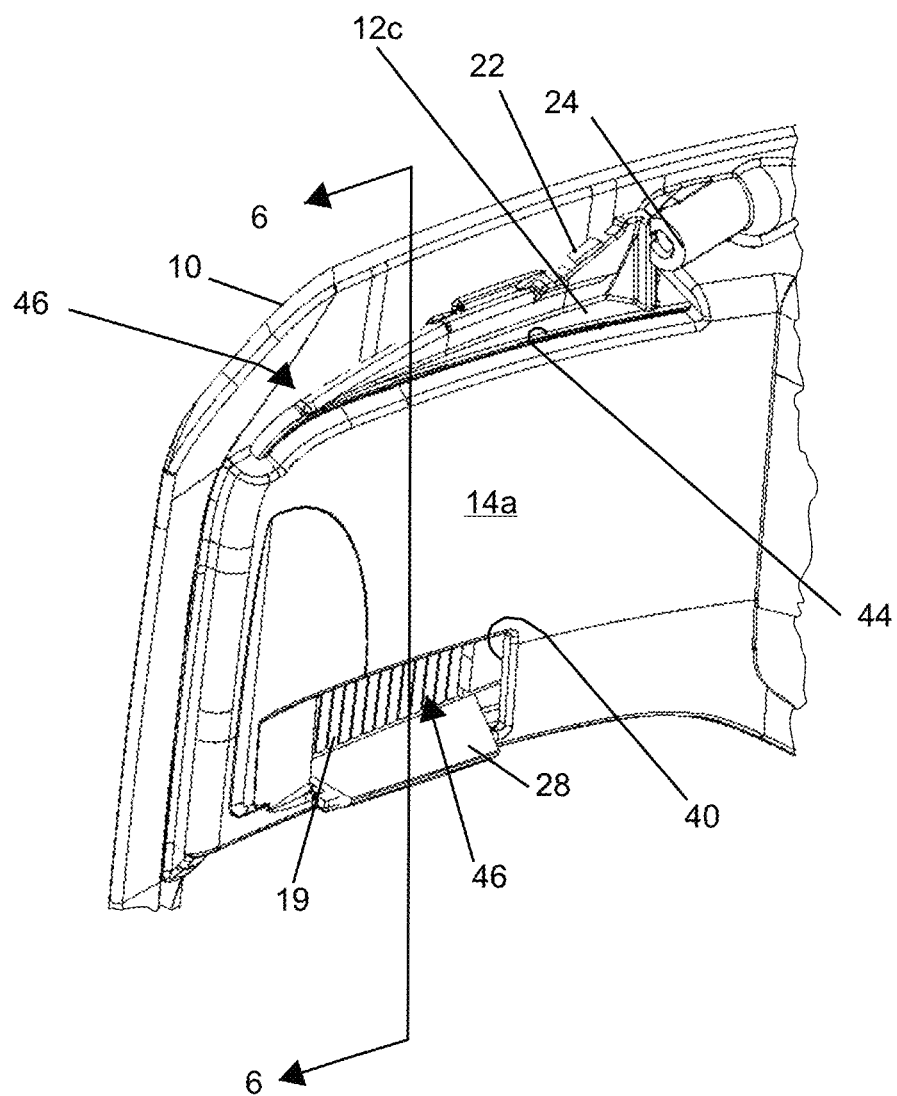

VEHICLE LIGHT ASSEMBLY HAVING A REFLEX LENS WITH A LOCKING DETENT

BACKGROUND OF THE INVENTION

1. Field of the Invention

This invention relates to a lighting assembly or module for a vehicle and, more particularly, to a side marker reflex lens with a non-visible integral detent or lock.

2. Description of the Related Art

In the field of vehicle lighting, government regulations require side marker lamps or side reflex reflectors to be situated toward a front and a rear and on each side of the vehicle. In general, the side markers on the front of the vehicle are generally perpendicular to a vehicle centerline whereas rear side markers are generally parallel to the vehicle centerline in most instances.

The side marker lamps enable a driver of another vehicle to see the vehicle when the driver is approaching the vehicle, for example, at an angle at night. Thus, side markers are intended to enable the oncoming vehicle driver to see the vehicle early enough that the driver can stop in time to prevent a collision or, at least, slow down to reduce the severity of a collision. Side marker lamps have been proven to prevent many accidents and reduce injuries.

The side marker reflex lens was typically attached to a support, such as a bezel or housing, by way of welding. The support often had a window opening that was adapted to receive light from a light source in order to provide the side marker function. Typically, the side marker reflex lens had optics aligned with the window opening in the support to distribute the light received from the window.

Sometimes, a sonic weld would be used to directly weld the reflex lens to its support, such as a back plate on a bezel. One problem with weld attachments is the additional manufacturing step of welding the reflex lens onto the back plate as well as the traditional problems of the weld failure. The additional welding manufacturing step is both time consuming and increases cost of the assembly.

Manufacturers are continually trying to improve aesthetic features and functionality of lamp designs on vehicles to make them more appealing to their customers. Different types of fastening techniques, such as screw fasteners, were not used because they were visible. They also required additional manufacturing steps which increased costs.

What is needed, therefore, is an improved system and method for mounting a reflex lens assembly onto a support on a vehicle.

SUMMARY OF THE INVENTION

A primary object of the invention is to provide a vehicle side marker light assembly and apparatus for detachably securing a reflex lens to a support.

Another object of the invention is to provide a lock or snap-fit feature to a reflex lens to improve the means by which the reflex lens is mounted on the support.

Still another object of the invention is to provide a reflex lens having at least one resilient detent or lock that is adapted to enable the reflex lens to be snap-fit onto a support in a light assembly on the vehicle.

Yet another object of the invention is to provide a snap-fit and lock feature for attaching a reflex lens to a support, while disguising the lock or snap-fit feature so that it is not visible when viewing the reflex lens after it is situated on the vehicle.

Yet another object of the invention is to provide at least one resilient lock or snap-fit feature that cooperates or utilizes a conventional window opening of the support to which it is mounted.

Another object of the invention is to provide a snap-fit lock feature on at least one perimeter wall or band around the side marker window that is on the reflex lens.

Another object of the invention is to provide at least one lock or snap-fit feature that is incorporated as part of a side marker window in a reflex lens wherein the lock or snap-fit feature is disguised in the final product as a result of being part of the side marker window.

In one aspect, one embodiment of the invention comprises a reflex lens for use on a vehicle, comprising a lens body having a first area for reflecting light and a second area for distributing light from at least one light source; the lens body further comprising a top wall, a generally opposing bottom wall, a first side wall and second side wall that generally opposes the first side wall; the lens body having at least one detent or lock associated with the second area; the at least one detent or lock engaging a surface on a support to which the lens body is mounted in order to lock or secure the lens body onto the support.

In another aspect, another embodiment of the invention comprises a light assembly for use on a vehicle, comprising a support mounted on the vehicle; at least one light source; a lens body having a first area for reflecting light and a second area for distributing light from at least one light source; the lens body further comprising a top wall, a generally opposing bottom wall, a first side wall and second side wall that generally opposes the first side wall; the lens body having at least one detent or lock associated with the second area; the at least one detent or lock engaging a surface on a support to which the lens body is mounted in order to lock or secure the lens body onto the support.

This invention, including all embodiments shown and described herein, could be used alone or together and/or in combination with one or more of the features covered by one or more of the following list of features:

The reflex lens wherein the at least one detent or lock is not visible when viewing an exit surface of the lens after it is mounted on the vehicle.

The reflex lens wherein the support has an interior wall that defines an opening having a shape that generally corresponds to a shape of the second area, the at least one detent or lock operatively engaging the interior wall to lock the lens body onto the support.

The reflex lens wherein the at least one detent is generally L-shaped in cross section and snap-fits onto the support.

The reflex lens wherein the at least one detent is integrally or monolithically formed in the lens body.

The reflex lens wherein the at least one detent or lock comprises a first end that is integrally or monolithically formed in the lens body and a free end having a detent.

The reflex lens wherein the at least one detent is resilient or elastic.

The reflex lens wherein the support comprises a bezel or a housing of a headlamp assembly.

The reflex lens wherein the first area is a reflex area and the lens body is amber and provides a side marker for the vehicle when the lens body is mounted on the support.

The reflex lens wherein the support comprises a second wall that defines an elongated aperture, the at least one detent is associated with a bottom wall of the lens body and the top wall comprises a projection that is adapted to be received in the elongated aperture and permit the lens body to be pivoted to a locked position whereupon the at least one detent can engage the surface on the support and lock the lens body onto the support.

The light assembly wherein the at least one detent or lock is not visible when viewing an exit surface of the lens after it is mounted on the vehicle.

The light assembly wherein the support has an interior wall that defines an opening having a shape that generally corresponds to a shape of the second area, the at least one detent or lock operatively engaging the interior wall to lock the lens body onto the support.

The light assembly wherein the at least one detent is generally L-shaped in cross section and snap-fits onto the support.

The light assembly wherein the at least one detent is integrally or monolithically formed in the lens body.

The light assembly wherein the at least one detent is resilient or elastic.

The light assembly wherein the support comprises a bezel or a housing of a headlamp assembly.

The light assembly wherein the first area is a reflex area and the lens body is amber and provides a side marker for the vehicle when the lens body is mounted on the support.

The light assembly wherein the support comprises a second wall that defines an elongated aperture, the at least one detent is associated with a bottom wall of the lens body and the top wall comprises a projection that is adapted to be received in the elongated aperture and permit the lens body to be pivoted to a locked position whereupon the at least one detent can engage the surface on the support and lock the lens body onto the support.

These and other objects and advantages of the invention will be apparent from the following description, the accompanying drawings and the appended claims.

BRIEF DESCRIPTION OF THE ACCOMPANYING DRAWINGS

FIG. 3A is a rear view of the bezel after the reflex lens is mounted thereon;

FIG. 3B is a fragmentary rear perspective view illustrating further details of the embodiment shown and described;

DETAILED DESCRIPTION OF THE PREFERRED EMBODIMENTS

Figure 1:
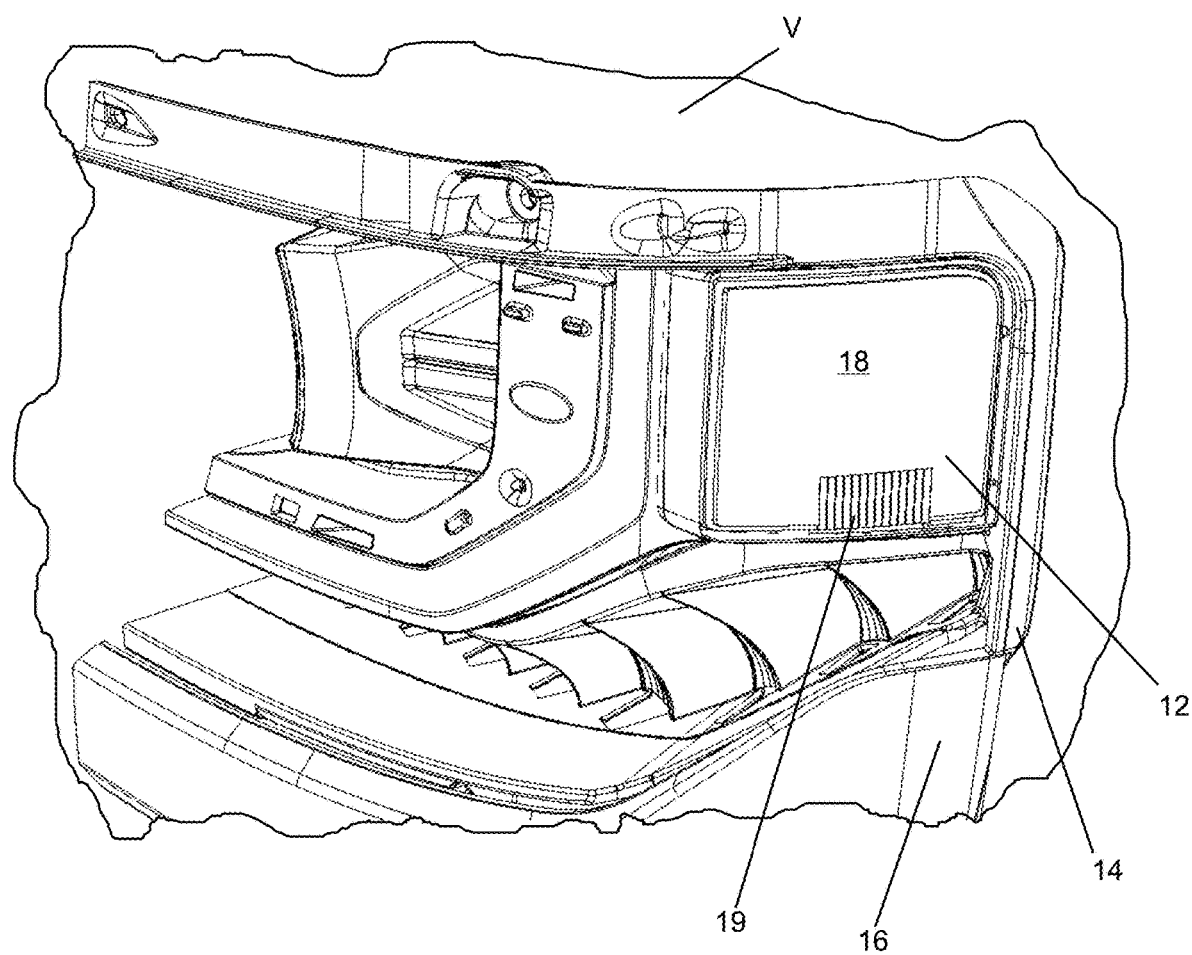
FIG. 1 is a fragmentary view illustrating a side marker assembly in accordance with one embodiment of the invention.
Figure 7:
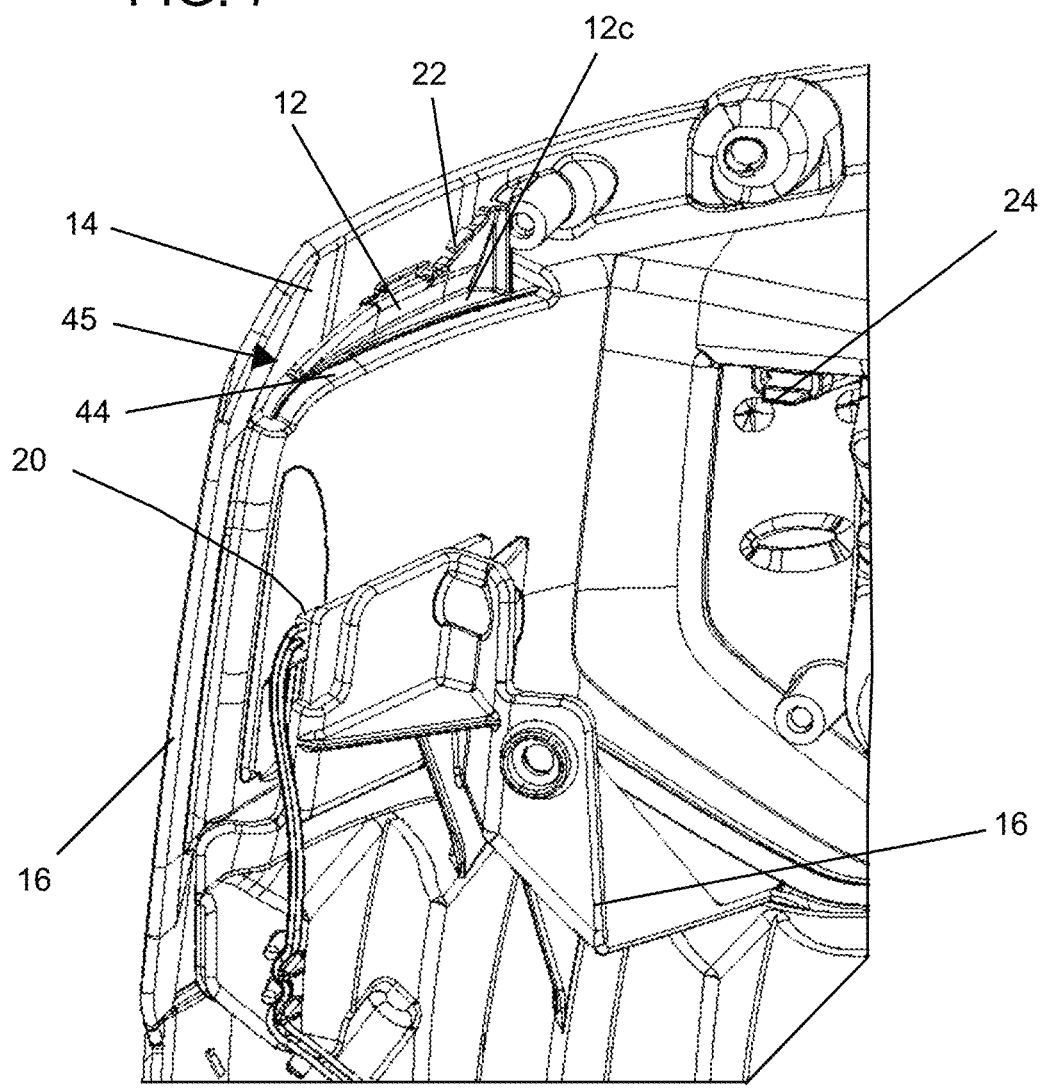
FIG. 7 is a fragmentary view illustrating at least one light source situated directly behind the window in the support.

Referring now to FIG. 1, a vehicle V is shown comprising a lamp assembly 10 in accordance with one embodiment of the invention. The lamp assembly 10 is for a side marker light in the illustration and it comprises a side marker reflex lens or window 12 that is mounted on a bezel 14 which in turn is mounted to a housing 16 (FIG. 7). For ease of illustration, various portions of the lamp assembly 10, such as the outer lens of the lamp assembly 10, portions of the housing 16 and various other components are not shown for ease of illustrating various features of the lamp assembly 10.

Figure 4A:
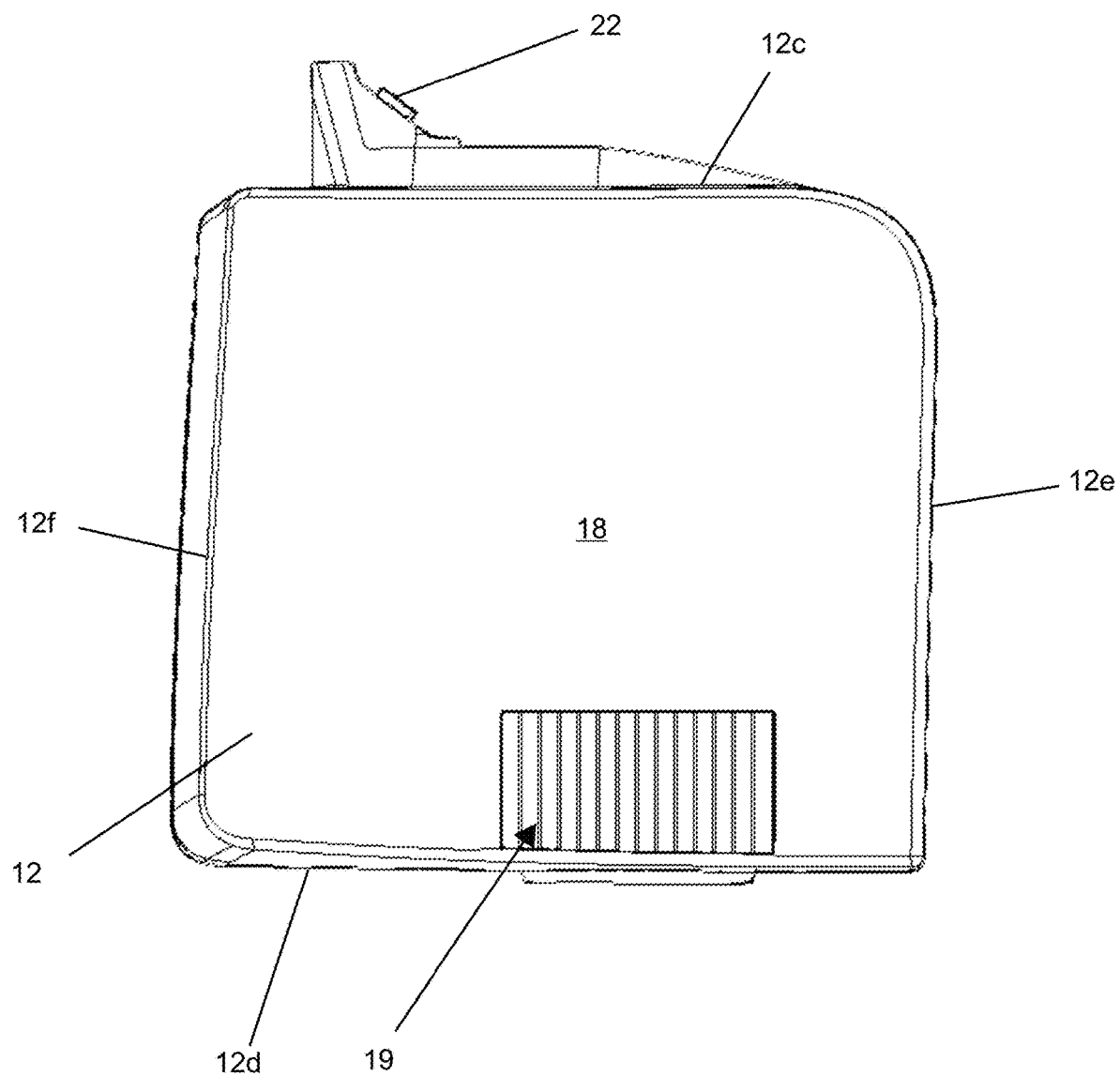
FIG. 4A is a front view of the reflex lens showing the side marker window.
Figure 4B:
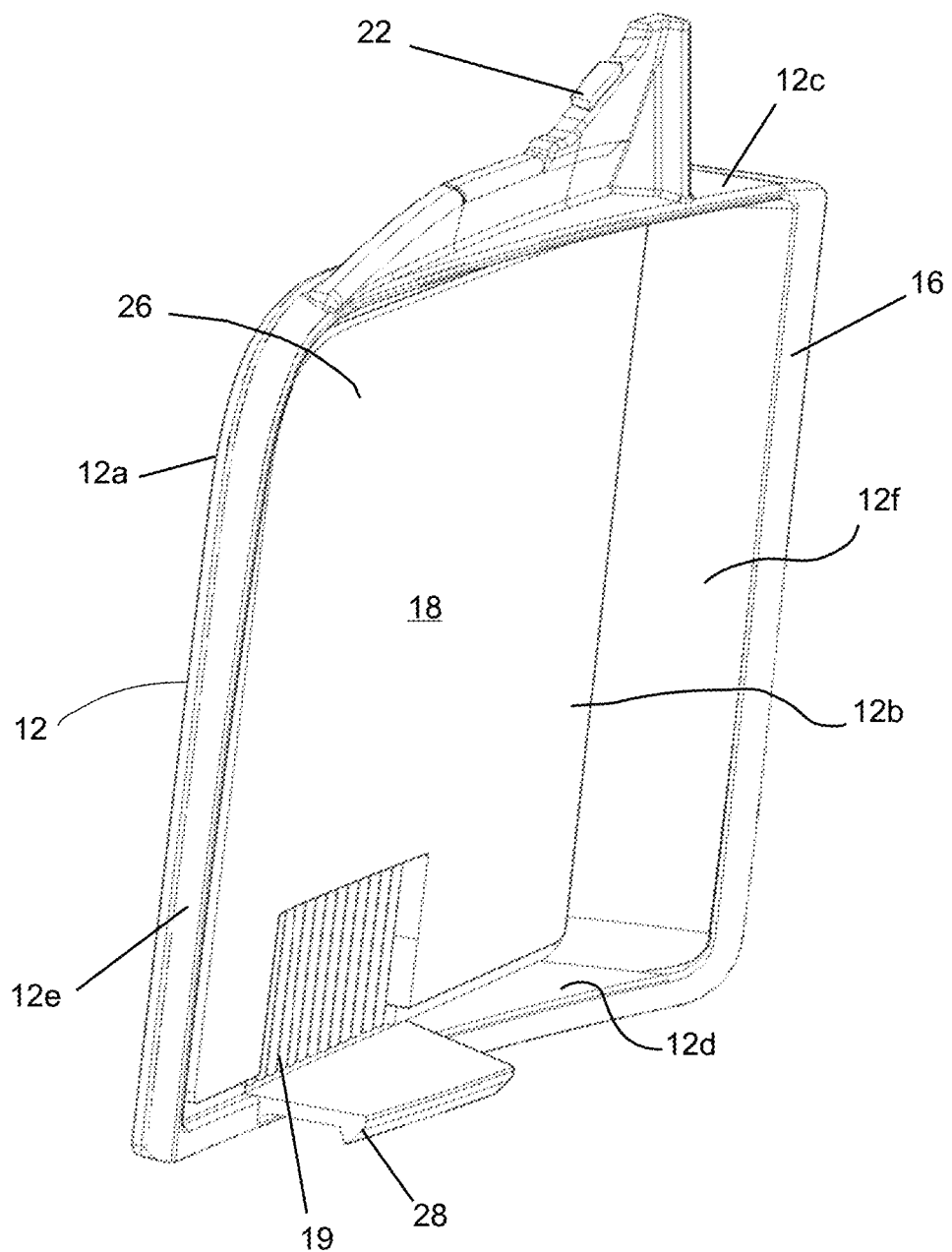
FIG. 4B is a rear perspective view of the reflex lens showing the at least one detent, lock or snap-fit arm that engages a support, such as a bezel.
Figure 4C:
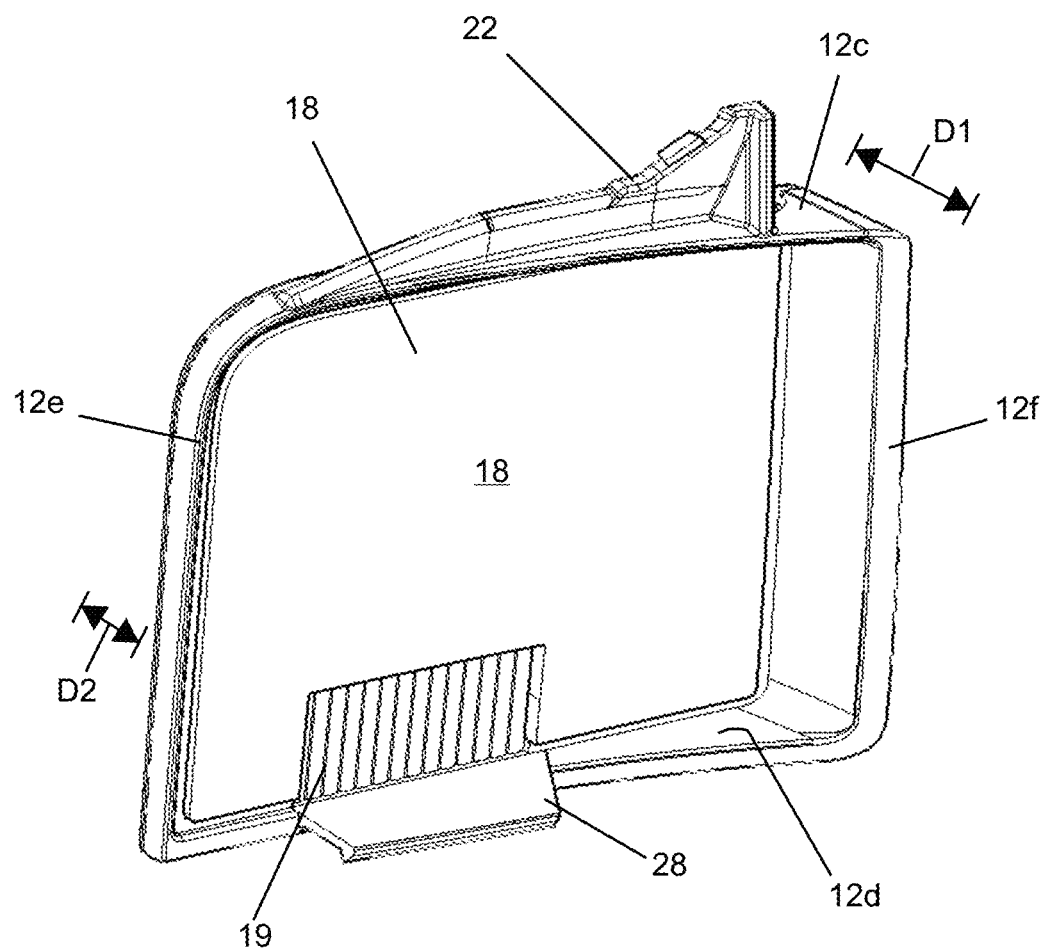
FIG. 4C is a rear view of the reflex lens showing further details of the embodiment.
Figure 4D:
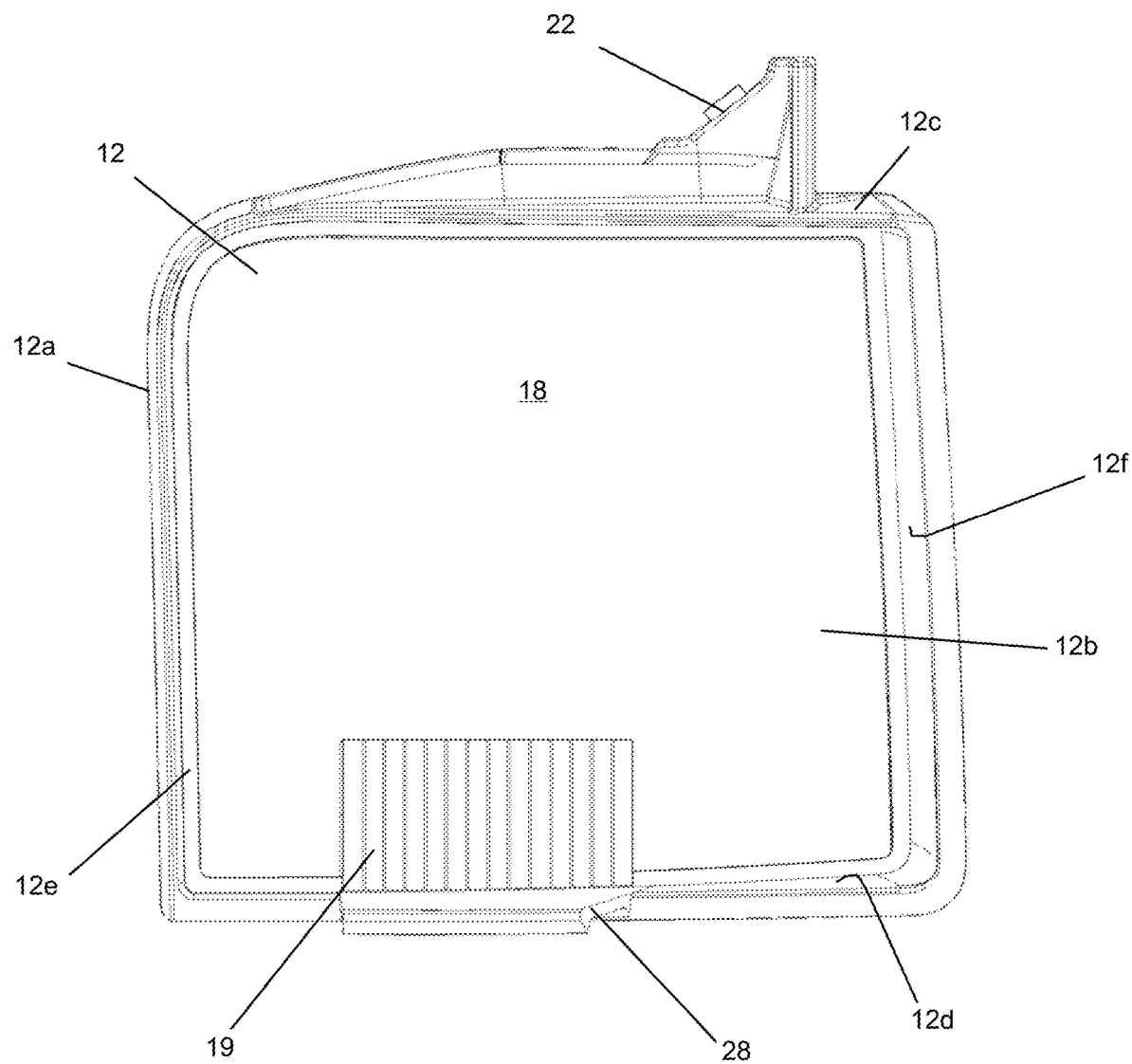
FIG. 4D is also a direct on rear view showing further details of the shape of the at least one lock, snap or resilient arm.
Figure 5:
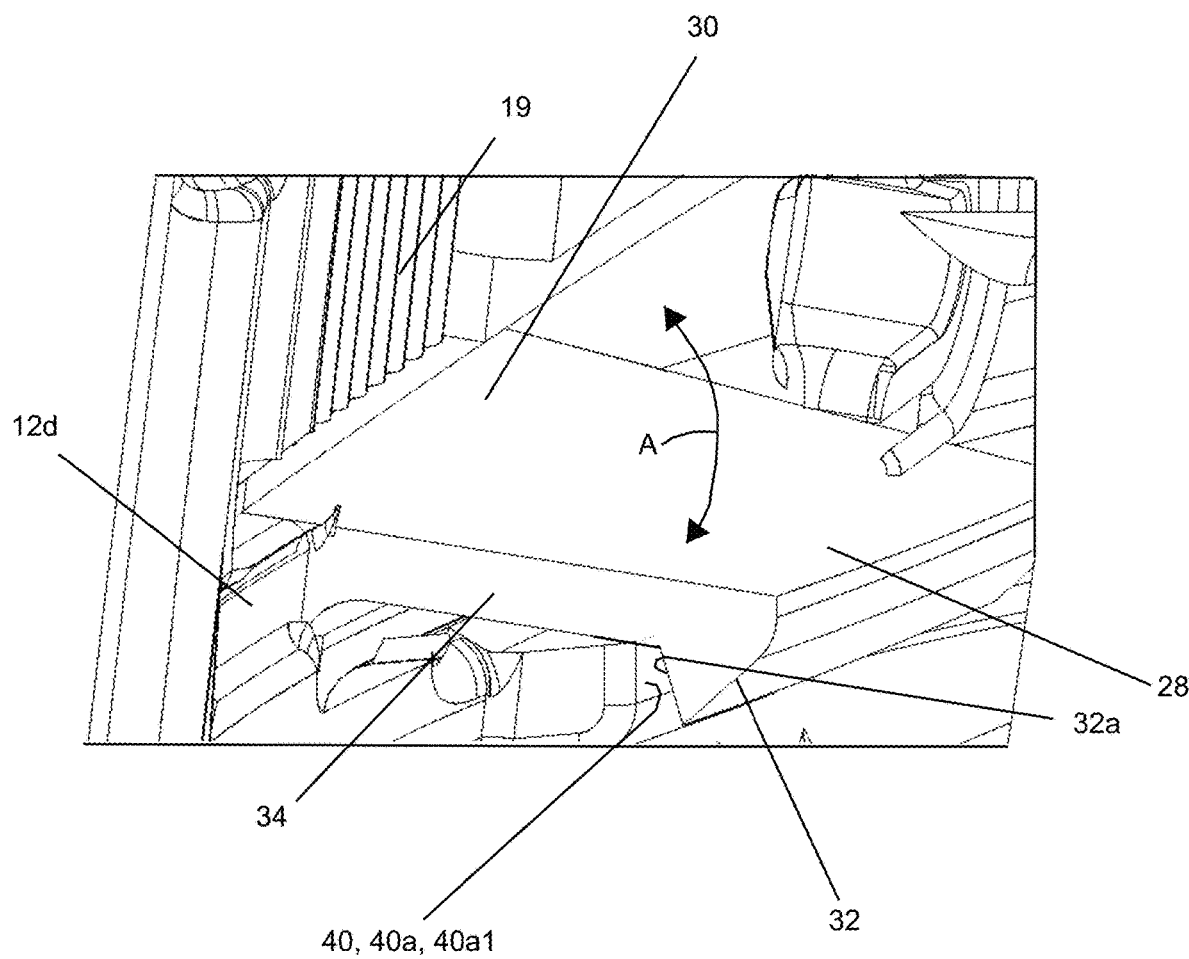
FIG. 5 is an enlarged view showing various features of the at least one lock, snap or resilient arm that engages and locks the reflex lens onto the support.

As mentioned, the lamp assembly 10 comprises the side marker reflex lens or window 12 which in the illustration being described is a side marker reflex lens or window for providing a side marker for the vehicle. FIGS. 1 and 4A illustrate a front view of the side marker reflex lens or window 12. In the illustration being described, the side marker reflex lens or window 12 comprises a reflex optic area 18 that permit the side marker reflex lens or window 12 to receive and reflect light in a manner conventionally known. In the illustration being described, the lamp assembly 10 may be situated on a side, but toward the front, of the vehicle V and/or toward the rear of the vehicle V. Some regulations require that those side marker windows or lenses that are situated toward the front of the vehicle V be amber, while those side marker windows or lenses situated toward the rear of the vehicle V be red. The side marker reflex lens or window 12 can be either color or even another color.

Note that the side marker reflex lens or window 12 also comprises a horizontal optical area 19 that distributes light horizontally from a light source 20 mounted on or associated with the housing 16 as illustrated in FIG. 7. In the embodiment being described, the horizontal optical area 19 distributes light received from the light source 20 horizontally (relative to the ground) for enhancing the side lighting function to enhance visibility of the vehicle.

Note in FIGS. 4A-4D, the side marker reflex lens or window 12 comprises a front surface 12a and a rear surface 12b. The side marker reflex lens or window 12 further comprises a top wall 12c, a generally opposing bottom wall 12d, a first side wall 12e and a generally opposing second side wall 12f. Note that the top and bottom walls 12c and 12d gradually increase in width as they extend from the first side wall 12e to the second side wall 12f as illustrated. Note also that the second side wall 12f has a dimension D1 (FIG. 4C) that is greater than distance D2 of side wall 12e.

The top wall 12c comprises a projection 22 that is integrally formed in the top wall 12c and provides a light guide for receiving light from a second light source 24

Figure 6:
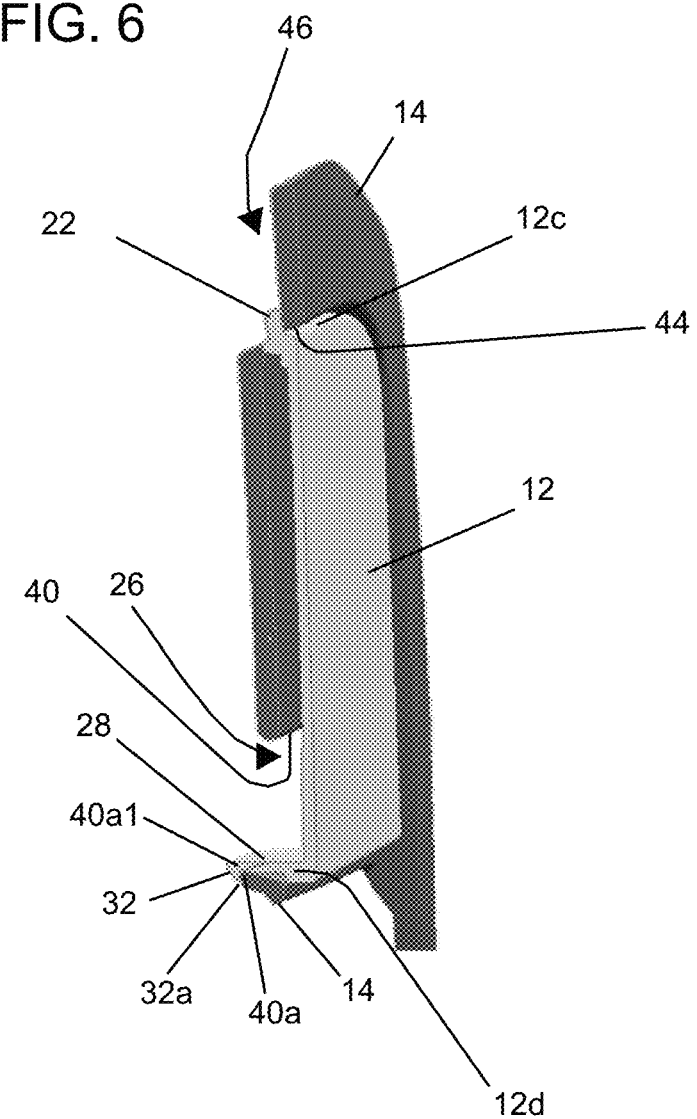
FIG. 6 is a sectional view taken along the line 6-6 in FIG. 3B.

(FIGS. 3A-3B and 7) and directs it into the area 26 (FIG. 6), which is an area between the bezel 14 and the side marker reflex lens or window 12. Note also that some light from the second light source 24 may also be directed into the side marker reflex lens or window 12.

As best illustrated in FIGS. 4B-4D and 5, note that the bottom wall 12d comprises a resilient arm or detent 28 having a first end 30 integrally or monolithically formed in the wall 12d, a detent end 32 and a joining portion 34 which joins the detent end 32 to the integrally or monolithically formed first end 30 as shown. In the illustration, the resilient arm or detent 28 is generally L-shaped in cross-section and snap-fits onto the wall 40 of the bezel 14. The resilient arm or detent 28 is resilient and/or elastic and can flex in the direction of double arrow A in FIG. 5 so that the detent end 32 of the resilient arm or detent 28 can be snap-fit and locked onto the bezel 14 in a manner that will now be described.

Figure 2A:
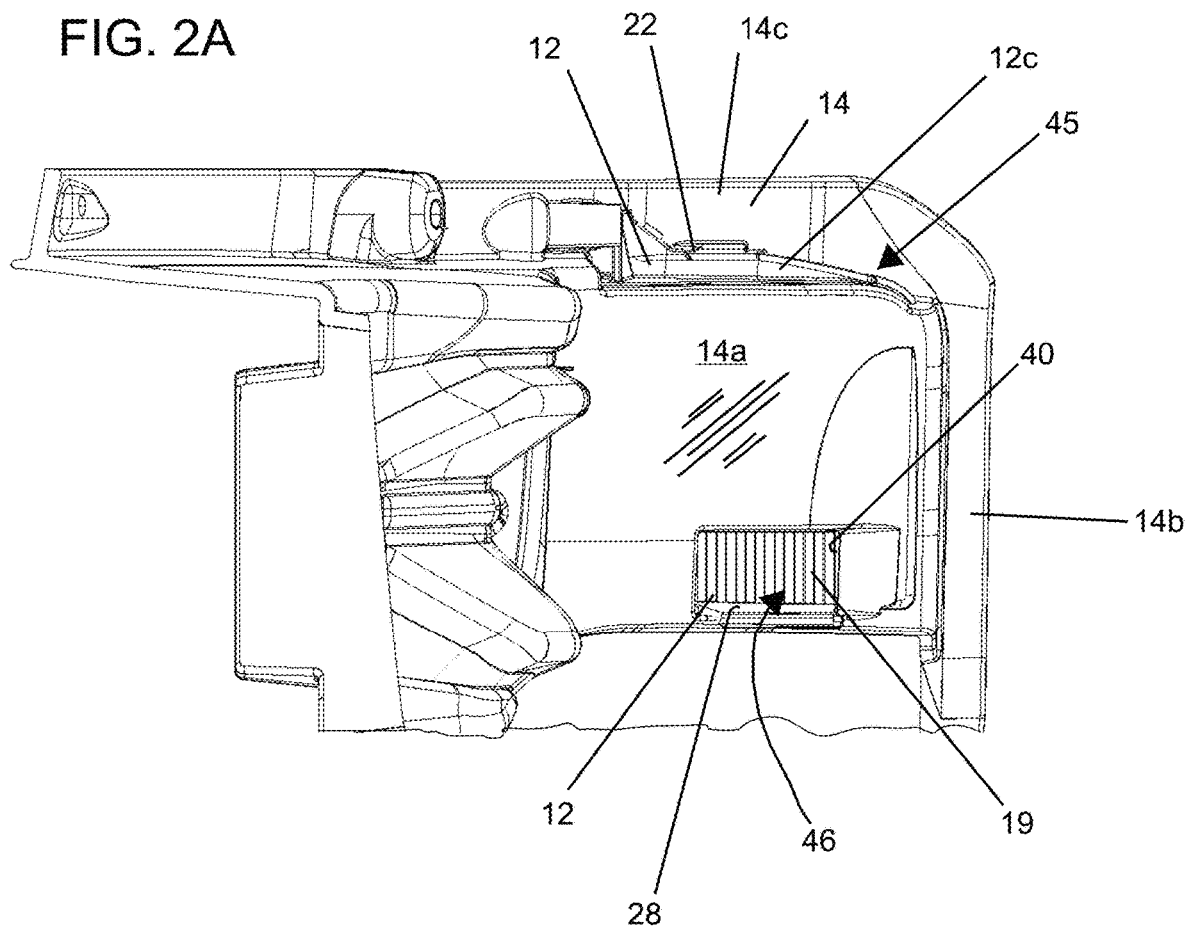
FIG. 2A is a rear view of a bezel after a side marker reflex lens is mounted thereto and illustrating at least one detent or snap-fit lock extending through the window of the bezel.
Figure 2B:
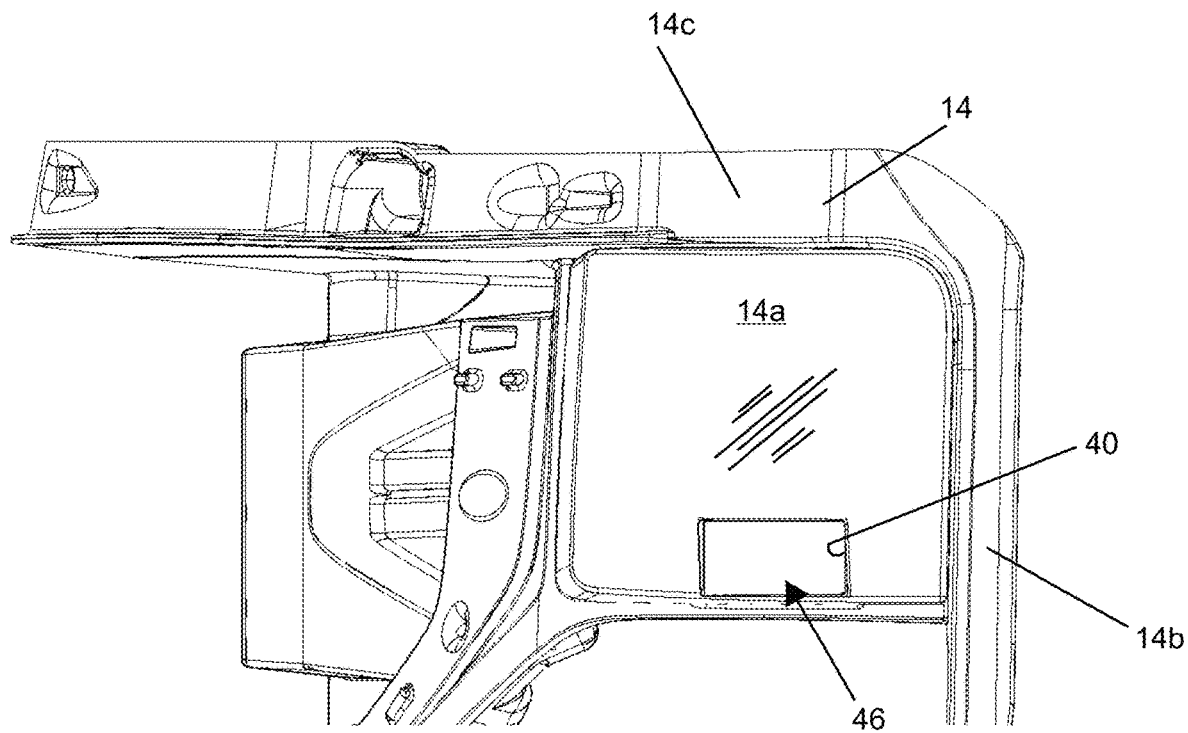
FIG. 2B is a front view of the bezel showing a back plate wall and a side marker window through which light is projected and prior to the reflex lens being mounted to the bezel.
Figure 8:
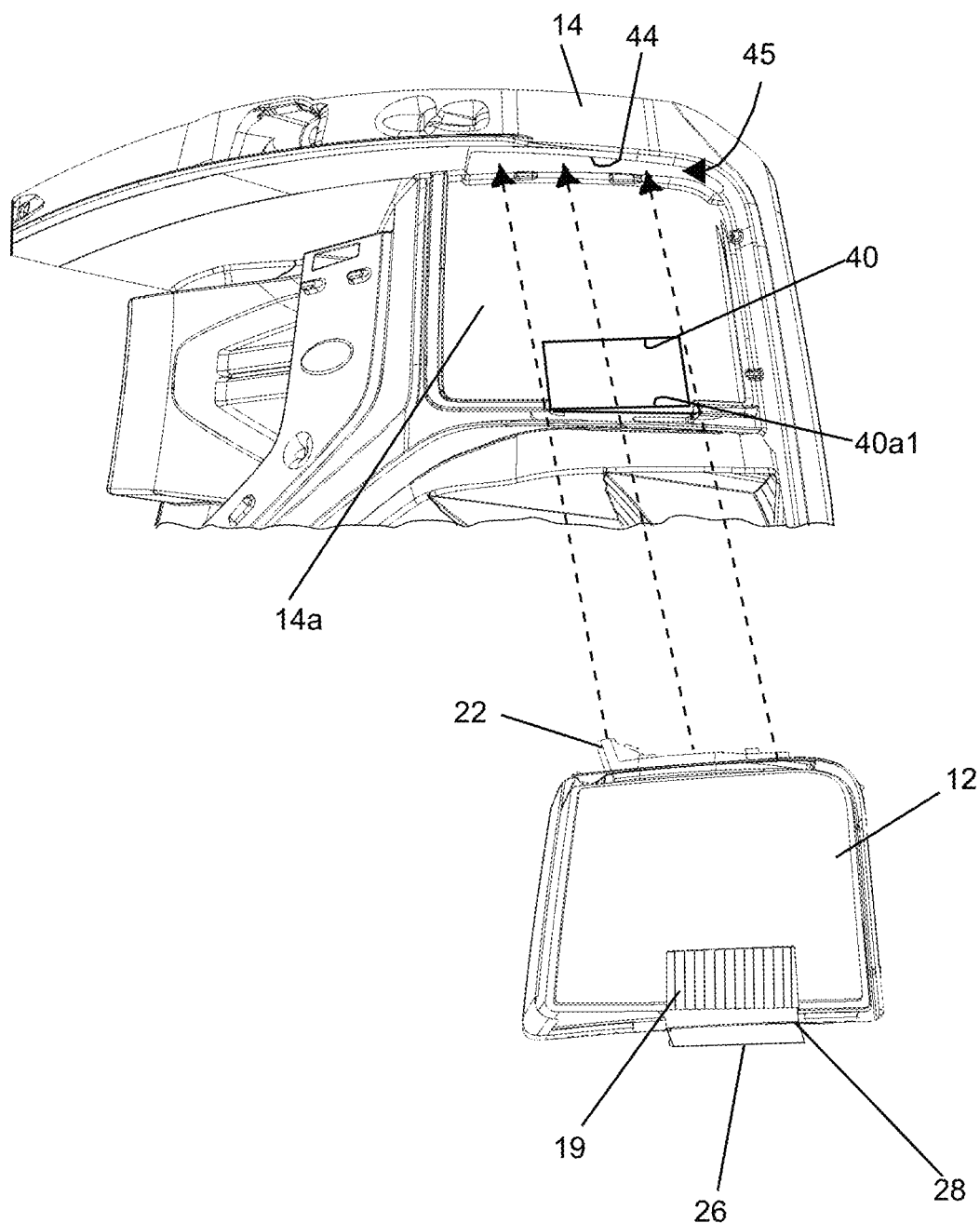
FIG. 8 is a sectional view illustrating the mounting of the reflex lens onto the support.

Referring to FIGS. 2B and 8, note that the bezel 14 is formed to comprise a first wall portion or back panel 14a having surrounding wall portions or flanges 14b and 14c as shown. The wall portion 14a comprises a generally rectangular interior wall 40 that defines a generally rectangular aperture 42. The wall portion or flange 14c comprises an interior wall 44 (FIG. 7) that defines an elongated aperture 46 adapted and configured to receive the projection 22 of the side marker reflex lens or window 12 when it is detachably mounted to the bezel 14.

During installation, the side marker reflex lens or window 12 is moved toward the bezel 14 and the projection 22 is inserted into the aperture 46 which automatically registers the resilient arm or detent 28 in operative relationship with the aperture 46. As the side mark reflex lens or window 12 is pivoted or moved from an open position (illustrated in phantom in FIG. 8) to the closed position, and the resilient arm or detent 28 is moved in the direction of arrow B in FIG. 8, the detent portion 32 snap-fits onto the wall 40 of the bezel 14. Note in FIG. 5 that the detent portion 32 comprises a surface 32a that becomes generally opposed to and engages a surface 40a1 of the portion or flange 40a.

Note that once the side marker reflex lens or window 12 is mounted on the bezel 14, as illustrated in FIGS. 2A and 3A-3B, the horizontal optic area 19 of the side marker reflex lens or window 12 becomes operatively and automatically positioned relative to the window or aperture 42 in the bezel 14. The at least one light source 20 on the housing 16, when illuminated, projects light into the area 26 and ultimately through the horizontal optic area 19 of the side marker reflex lens or window 12.

Figure 2C:
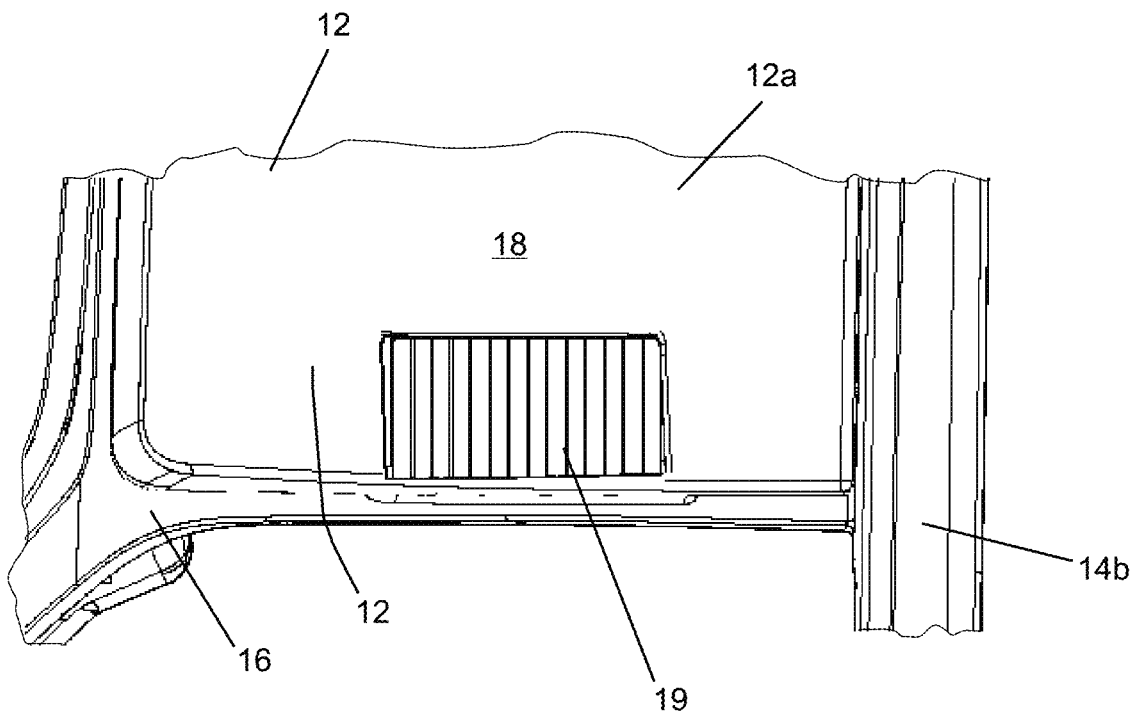
FIG. 2C is a fragmentary front view of the bezel after the reflex lens is mounted thereto illustrating a side marker window in the reflex lens.

It is important to note that when viewed from the front, as illustrated in FIGS. 2A-2C, the resilient arm or detent 28 provides a fastener or lock that improves aesthetic functionality of the design. Note also that the resilient arm or detent 28 is adapted to not only be hidden, but to also provide the means by which the side marker reflex lens or window 12 is mounted and secured to the bezel 14, which reduces or eliminates the need for additional parts, fasteners, welds or the like. Thus, the integral lock of the resilient arm or detent 28 of the side marker reflex lens or window 12 detachably secures the side marker reflex lens or window 12 to the bezel 14 while providing no visible attachment features in the lamp assembly 10. The resilient arm or detent 28 provides means for fastening the side marker reflex lens or window to the bezel 14 while also being simultaneously hidden or disguised after mounting.

Advantageously, this design takes advantage of the side marker reflex lens or window 12 and the wall 40 of the bezel 14 to provide or define a frame that is adapted to hide and disguise the snap feature. The features could also be used with other components, such as the housing 16, to which the side marker reflex lens or window 12 may be mounted.

During removal, the resilient arm or detent 28 can be actuated or moved so that the side marker reflex lens or window 12 can be removed or dismounted from the bezel 14.

Although the embodiment illustrated herein shows a single resilient arm or detent 28, it should be appreciated that one or more other arms or detents 28 (not shown) or flanges could be used to detachably secure the side marker reflex lens or window 12 to the bezel 14. Although not shown, it should be appreciated that the bezel 14 may comprise the resilient arm or detent 28, with the side marker reflex lens or window 12 comprising a mating wall surface (not shown) for detachably mounting the side marker reflex lens or window 12 onto the bezel 14.

This invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus and method herein described constitute preferred embodiments of this invention, it is to be understood that the invention is not limited to this precise system, apparatus and method, and that changes may be made therein without departing from the scope of the invention which is defined in the appended claims.

What is claimed is:

1. A reflex lens for a vehicle, the reflex lens comprising:
   a lens body having a first optical member comprising a single, substantially planar, front surface and a single, substantially planar, rear surface, for reflecting light, and a second optical member embedded within the first optical member so that the second optical member is recessed within the space delimited by the front surface and the rear surface of the first optical member, the second optical member extending along a direction parallel to the front surface and the rear surface of the first optical member, for distributing light from at least one light source, the lens body further comprising:
   a top wall, an opposing bottom wall, a first side wall and a second side wall that opposes the first side wall,
   the lens body having at least one detent or lock formed in the bottom wall, the at least one detent or lock having a first end extending up to the plane of the second optical member, and
   the at least one detent or lock engaging a surface on a support to which the lens body is mounted in order to snap-fit, lock or secure the lens body onto the support.

2. The reflex lens as recited in claim 1 wherein
   the at least one detent or lock is not visible in a front view of an exit surface of the lens and is visible in a rear view of the exit surface of the lens.

3. The reflex lens as recited in claim 1 wherein
   the support has an interior wall that defines an opening having a shape that corresponds to a shape of the second optical member, the at least one detent or lock operatively engaging the interior wall to lock the lens body onto the support.

4. The reflex lens as recited in claim 1 wherein
   the at least one detent is substantially L-shaped in cross section and snap-fits onto a surface or wall of the support.

5. The reflex lens as recited in claim 1 wherein the at least one detent is integrally or monolithically formed in the lens body.

6. The reflex lens as recited in claim 3 wherein the at least one detent or lock comprises a first end that is integrally or monolithically formed in the lens body and a free end having a detent.

7. The reflex lens as recited in claim 1 wherein the at least one detent is resilient or elastic.

8. The reflex lens as recited in claim 1 wherein the support comprises a bezel or a housing of a headlamp assembly.

9. The reflex lens as recited in claim 1 wherein the first optical member includes a reflex area and the lens body is amber in color and provides a side marker for the vehicle after the lens body is mounted on the support.

10. The reflex lens as recited in claim 1 wherein the support comprises a second wall that defines an elongated aperture, the at least one detent is associated with the bottom wall of the lens body and the top wall comprises a projection that is adapted to be received in the elongated aperture and permit the lens body to be pivoted to a locked position, whereupon the at least one detent can engage the surface on the support and lock the lens body onto the support.

11. The reflex lens as recited in claim 1 wherein the top wall and the bottom wall gradually increase in width as they extend from the first side wall to the second side wall.

12. A light assembly, comprising:
a support mounted on a vehicle;
at least one light source; and
a lens body having a first optical member comprising a single, substantially planar, front surface and a single, substantially planar, rear surface, for reflecting light, and a second optical member embedded within the first optical member so that the second optical member is recessed within the space delimited by the front surface and the rear surface of the first optical member, the second optical member extending along a direction parallel to the front surface and the rear surface of the first optical member, for distributing light from at least one light source, the lens body further comprising:
a top wall, an opposing bottom wall, a first side wall and a second side wall that opposes the first side wall,
the lens body having at least one detent or lock formed in the bottom wall, the at least one detent or lock having a first end extending up to the plane of the second optical member, and
the at least one detent or lock engaging a surface on the support to which the lens body is mounted in order to snap-fit, lock or secure the lens body onto the support.

13. The light assembly as recited in claim 12 wherein the at least one detent or lock is not visible in a front view of an exit surface of the lens and is visible in a rear view of the exit surface of the lens.

14. The light assembly as recited in claim 12 wherein the support has an interior wall that defines an opening having a shape that corresponds to a shape of the second optical member, the at least one detent or lock operatively engaging the interior wall to lock the lens body onto the support.

15. The light assembly as recited in claim 12 wherein the at least one detent is substantially L-shaped in cross section and snap-fits onto the support.

16. The light assembly as recited in claim 12 wherein the at least one detent is integrally or monolithically formed in the lens body.

17. The light assembly as recited in claim 12 wherein the at least one detent is resilient or elastic.

18. The light assembly as recited in claim 12 wherein the support comprises a bezel or a housing of a headlamp assembly.

19. The light assembly as recited in claim 12 wherein the first optical member includes a reflex area and the lens body is amber in color and provides a side marker for the vehicle after the lens body is mounted on the support.

20. The light assembly as recited in claim 12 wherein the support comprises a second wall that defines an elongated aperture, the at least one detent is associated with the bottom wall of the lens body and the top wall comprises a projection that is adapted to be received in the elongated aperture and permit the lens body to be pivoted to a locked position, whereupon the at least one detent can engage the surface on the support and lock the lens body onto the support.

* * * * *